Feb. 24, 1942.　　　H. U. HOLZER　　　2,273,959
CONTAINER
Filed April 24, 1940
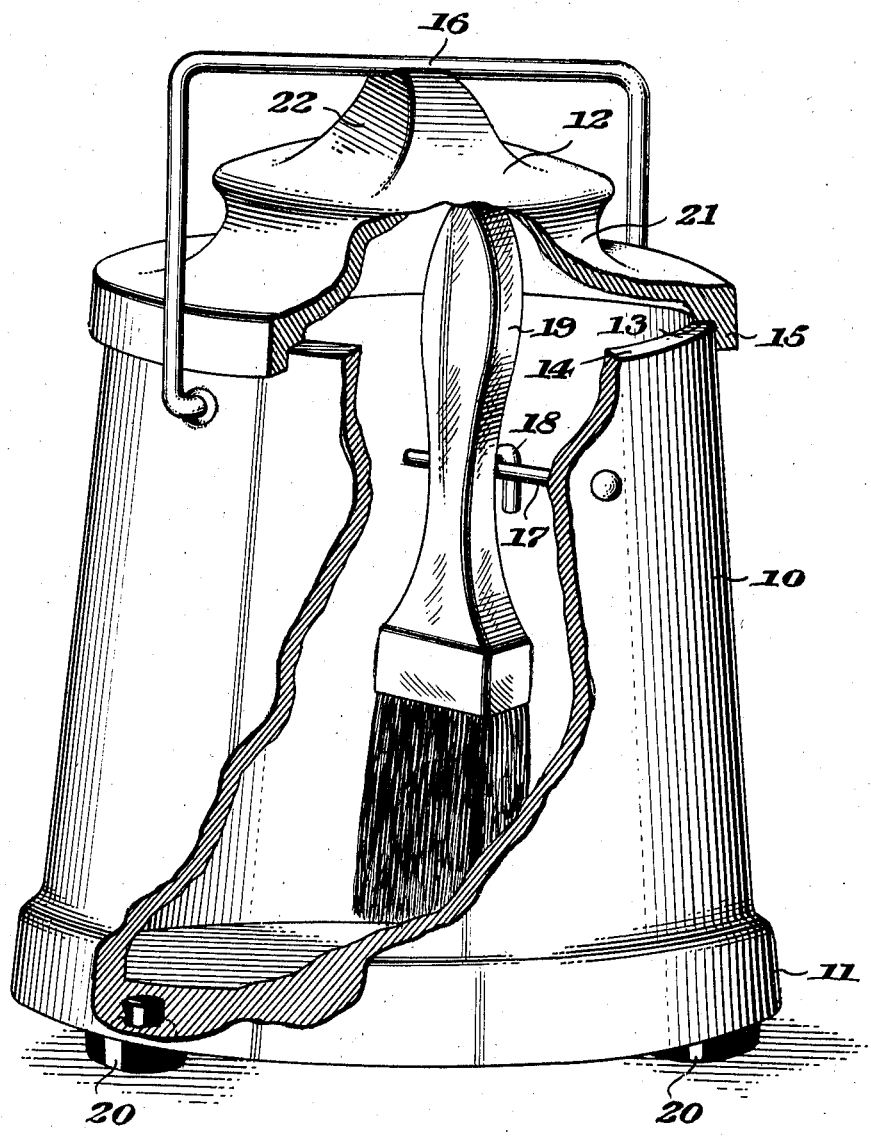
Inventor,
Henry U. Holzer.
By Geo. K. Woodworth, atty.

Patented Feb. 24, 1942

2,273,959

UNITED STATES PATENT OFFICE 2,273,959

CONTAINER

Henry U. Holzer, Boston, Mass.

Application April 24, 1940, Serial No. 331,275

1 Claim. (Cl. 206—15.1)

My invention relates to containers for liquids, such as varnish, lacquer, shellac, and quick drying enamel paint, and the like covering materials which are extremely adhesive and contain one or more volatile ingredients.

Because of the volatile nature of such covering materials, it has been found necessary to store them in air-tight containers, usually those of the press-top type, but on account of their adhesiveness or stickiness the users of such materials have found the containers now in use to be inconvenient and troublesome.

It is the object of the present invention to provide a container for such materials which shall not only be practically air-tight, but shall also render the contents thereof quickly and easily accessible for use in applying the same to the surfaces to be covered.

With this object in view, I provide a container and a cover therefor, the co-operating surfaces of which lie in the same plane and are ground to afford an air-tight closure whereby the cover may be readily removed without the aid of an implement. To insure the registration of the said co-operating elements, the cover may be provided with a lip which overlies the rim of the container and is in loose engagement with the outer wall thereof. The cover preferably is hollow and tapers upwardly so as to afford a substantial space between the rim of the container and the inner surface of the top of the cover to accommodate the upstanding handle of a brush removably secured to a rod or other combined brush support and wiper extending across the interior of the container, it being feasible to maintain a brush within the container when the cover makes an air-tight fit therewith.

Other objects of my invention and the means for attaining them will be hereinafter more fully set forth.

In the drawing which accompanies and forms a part of this specification, the figure represents a container embodying my invention, said container comprising a body portion 10, shown in the present instance as an open top conical vessel having a base 11, which preferably is made of greater diameter than the top portion in order to enhance the stability of the container when resting on a support.

Co-operating with the container portion is a cover 12, herein shown as tapering upwardly, and provided with a shouldered annular rim, the horizontal portion 13 of which rests on the upper rim 14 of the body portion. The two co-operating surfaces aforesaid which lie in the same plane are both ground to afford an air-tight closure. The outer portion 15 of the cover rim which forms a lip overlying the rim of the container proper is in fairly loose engagement with the outer wall of said container.

Thus it will be seen that by means of the lip 15 the proper registration of the vessel 10 and its cover 12 is insured. Means preferably are provided for maintaining the cover in co-operative engagement with the vessel, and in the present instance, such means is shown in the form of the bail 16 pivoted to the outer wall of the latter. It will be observed that by means of the construction described, the use of depressions and irregular surfaces, such as are necessary in pressed top closures, is avoided and that the drippings of the liquid which inevitably fall on the upper rim of the vessel during the application of such liquid may readily be wiped from the rim and the latter maintained as flat and as clean as the co-operating shoulder of the cover. There will therefore be no tendency for the cover and vessel to adhere to each other after the vessel has been in use for a while and then covered, although in the case of the airtight containers heretofore used for adhesive and volatile liquids it is the invariable experience of the users thereof that the adhesion of the cover and the vessel is so great that an implement is required to remove the cover.

The lip 15 not only provides for the proper registration of the two co-operating members, but also affords protection for the ground shoulder or seat 13 when the cover is laid aside during the use of the container.

It is preferable and desirable that the lip of the cover shall make a fairly easy fit with the vessel and to rely on the effectiveness of the ground seat for air-tight closure. In such case, the cover, by virtue of the loose engagement of the lip with the vessel, may be removed without substantial effort by one hand of the user.

Secured to and extending across the interior of the vessel is a combined brush support and wiper 17 upon which by any convenient means, such as the hook 18 secured to the brush handle 19, a brush may be supported in the liquid enclosed within the vessel; said rod also affords a convenient means for wiping the excess liquid from the brush every time it is lifted from the vessel for applying such liquid to the surfaces to be covered.

Preferably, the container is made of glass or ceramic material, on which the covering materials for which my container is designed do not react, and in such case, it is desirable to provide protection against breakage in the form of resilient blocks 20. Whatever the material, it is desirable that three feet, or supporting members, preferably of resilient material, secured to and projecting beyond the under surface of the base be employed to afford stability, especially if the container is placed on an irregular surface, and to prevent the slipping of the vessel during the painting operation, or the sliding of the same when placed on a sloping surface. If such feet of rubber, or like material, are not used it has been found that the act of rubbing the brush against the wiper rod 17, which takes place every time the brush is dipped into the liquid and removed therefrom, exerts sufficient force to move the vessel laterally.

Preferably, the cover 12 is provided with a peripheral groove 21 to afford a finger hold when handling said cover, and the top part of the cover preferably tapers upwardly, as shown at 22, to afford a space for the fingers when carrying the container after the bail has been swung over the ridge to press the cover firmly against the container portion.

Having thus described an illustrative embodiment of my invention without, however, limiting the same thereto, what I claim and desire to secure by Letters Patent is:

An air-tight brush and liquid container for use in storing shellac or other highly volatile quick-drying sticky covering material and in holding the same during the application thereof by such brush, comprising in combination a conical body portion formed of glass, ceramic material and the like, and having a base, side walls and an open top, a hollow liftable cover means disposed on the upper rim of said body portion, said cover means tapering upwardly and its top inner surface being spaced a substantial distance away from the plane of the top of said body portion and its lower edge being a flat co-operating surface for engagement with said rim, the co-operating surfaces of said cover and rim being ground to afford an air-tight closure, an annular lip projecting from the lower portion of the cover and embracing the rim of said container, said lip loosely engaging the walls of the container, and brush-supporting means disposed in the interior of the body portion near the upper end thereof, whereby a brush may be supported in the air-tight container with the upper end of the handle thereof projecting into the hollow cover while the brush head is immersed in the shellac or other liquid.

HENRY U. HOLZER.